United States Patent [19]
Jenkin

[11] Patent Number: 6,064,658
[45] Date of Patent: May 16, 2000

[54] METHOD AND APPARATUS FOR ACCOMMODATING SIGNAL BLOCKAGE IN SATELLITE MOBILE RADIO SYSTEMS

[75] Inventor: Keith R. Jenkin, San Marcos, Calif.

[73] Assignee: TRW Inc., Redondo Beach, Calif.

[21] Appl. No.: 09/074,264

[22] Filed: May 7, 1998

Related U.S. Application Data

[62] Division of application No. 08/665,143, Jun. 14, 1996.

[51] Int. Cl.$^7$ ...................................................... H04B 7/00
[52] U.S. Cl. ........................................... 370/310; 375/347
[58] Field of Search ............................ 375/347; 370/310, 370/312

[56] References Cited

U.S. PATENT DOCUMENTS

| | | | |
|---|---|---|---|
| 4,535,471 | 8/1985 | Kuroda | 381/2 |
| 4,715,048 | 12/1987 | Masamura | 375/347 |
| 5,267,312 | 11/1993 | Thompson et al. | 380/19 |
| 5,283,780 | 2/1994 | Schuchman et al. | 370/312 |
| 5,517,686 | 5/1996 | Kennedy et al. | 455/273 |
| 5,561,849 | 10/1996 | Mankovitz | 455/45 |
| 5,835,487 | 11/1998 | Campanella | 370/316 |
| 5,864,579 | 1/1999 | Briskman | 375/200 |
| 5,867,530 | 2/1999 | Jenkin | 375/259 |
| 5,907,555 | 5/1999 | Raith | 370/468 |
| 5,912,917 | 6/1999 | Engelbrecht et al. | 375/37 |

*Primary Examiner*—Huy D. Vu
*Assistant Examiner*—Jasper Kwoh
*Attorney, Agent, or Firm*—Michael S. Yatsko

[57] ABSTRACT

A communication system 10 for providing uninterrupted radio operation, including: a pre-transmitter system 12 comprising: (i) a first buffer 14 for storing a sequence of digital audio samples from an audio source 16, the first buffer 30 having a beginning 18, an end 20 and a length 22; (ii) storing means 24 for storing the audio samples in the first buffer 14 in shift register configuration format; and (iii) frame construction means 26 for constructing a data frame including a first audio sample from the end 20 of the first buffer 14 and a second audio sample from the beginning 18 of the first buffer 14; wherein the data frame can be transmitted and received. The communication system 10 further includes a post-receiver system 28 comprising: (i) a second buffer 30 having a beginning 32, an end 34 and a length 36 identical to the length 22 of the first buffer 14; (ii) storing means 38 for storing the second audio sample in the received data frame in the second buffer 30 in shift register configuration format; (iii) means 40 for determining if the data frame was properly received; and (iv) selection means 42 for selecting an audio sample for audio output, wherein the first audio sample in the data frame is selected if the data frame was properly received, otherwise, an audio sample from the end 34 of the second buffer 30 is selected.

25 Claims, 18 Drawing Sheets

DEDICATED LOGIC EXAMPLE
(block diagram)

METHOD AND APPARATUS FOR ACCOMMODATING SIGNAL BLOCKAGE IN SATELLITE MOBILE RADIO SYSTEMS

This is a divisional application of U.S. patent application Ser. No. 08/665,143, filed Jun. 14, 1996.

BACKGROUND

The present invention generally relates to a system for accommodating radio signal blockage, and in particular to a system for accommodating signal blockage in satellite mobile radio systems.

With the increasing utilization of satellites for commercial data communication, radio broadcasting via satellite communication is becoming feasible. Radio channels are beamed from earth ground stations to orbiting satellites, which in turn beam the radio channels to individual users all over the earth.

In existing satellite radio systems, a broadcast studio generates analog audio signals much the same as a conventional radio station studio does. For example, an announcer provides real-time narration, and then typically plays music selections from a library of CD music albums. The analog signals are converted to a digital stream of samples, called PCM ("Pulse code modulation"). The conversion is performed for real-time voice or live music performances by passing the analog signals to an A/D ("analog-to-digital converter"). The digital output consists of 16 bit linearly quantized waveform amplitude samples for two channels (stereo right and left), at a sampling rate of approximately 44 kilosamples per second ("ksps"). This is the data stream quality of CD music in temporal sampling resolution and amplitude resolution. In the case of playing music CDs, the A/D step is not necessary since the audio data is already in a digital format on the CD.

The digital audio data is then passed to a satellite ground station for transmission to a satellite on its radio frequency "uplink" carrier. The data can be compressed to save bandwidth and other system resources. The satellite receives the signal from the ground station and retransmits it to the area on the earth's surface where radio reception is desired. For example, the satellite can have a "downlink" beam pattern that covers the continental United States.

The user's receiver (e.g., a car radio) decompresses the digital data, and converts it back to analog signals (one for each stereo channel) with a DAC ("digital-to-analog converter"), for subsequent amplification and listening through loudspeakers.

If a user is on a mobile platform, such as a moving automobile, then unique problems are encountered. There are many sources of line-of-sight obscuration as one drives along a typical road or highway. Foliage (trees) attenuates a downlink signal from the satellite, and can even render it unusable if the foliage is particularly dense. Furthermore, there are many sources of truly opaque blockage to the signal, such as telephone poles, billboards, buildings, bridge overpasses, and adjacent large vehicles.

The obstructions can be divided into two groups: (1) Attenuating: Those objects, such as trees or other foliage, which partially reduce signal strength, and (2) Opaque: Those objects which effectively cut off the line-of-sight signal from the satellite completely, such as telephone poles, buildings, overpasses, or even other adjacent vehicles. In the first case, there are several classical means of assuring adequate signal for acceptable reception. These include extra signal strength (called "link margin") broadcast from the satellite to "burn through" moderate foliage coverage, schemes such as interleaving redundant digital bits so that occasional single bit errors have imperceptible effect, and error-detection/correction "coding." As long as there is adequate signal (i.e., signal-to-noise ratio), and adequate error correction, radio performance is unaffected.

In the case of totally opaque objects other means have been proposed for accommodation. One is to employ two identical satellites, broadcasting the same radio program material. The satellites are positioned in their orbits such that the angle from each satellite to the user's radio is substantially different. Thus, the chances of both signals being obscured at the same time are unlikely, and radio operation continues without interruption. Another approach is to use two antennas mounted on the car, one fore (on the hood), and one aft (on the trunk lid). Smaller obstructions are thus accommodated, since at least one antenna is in view of a satellite as the vehicle travels along.

However, frequently, the signal from both satellites is lost. During such times, there is total signal loss "blockage" and there is no radio reception. As such, satellite radio use in automobiles is limited to the most barren of terrain, such as the open desert, because the continual and annoying dropout of a radio program is unacceptable to users. Further, use of two satellite systems is costly.

There is, therefore, a need for a satellite radio communication system which enables widespread use and acceptance of satellite radio. There is also a need for such a system to remedy signal loss due to occasional opaque blockages encountered while moving, allowing continuous, uninterrupted radio operation.

SUMMARY

The present invention satisfies these needs. The present invention provides a communication system for providing uninterrupted radio operation, comprising: a pre-transmitter system comprising: (i) a first buffer for storing a sequence of digital audio samples from an audio source, the first buffer having a beginning, an end and a length; (ii) means for storing the audio samples in the first buffer in shift register configuration format; and (iii) means for constructing a data frame including a first audio sample from the end of the first buffer and a second audio sample from the beginning of the first buffer; wherein the data frame can be transmitted and received.

The communication system further comprises a post-receiver system comprising: (i) a second buffer having a beginning, an end and a length identical to the length of the first buffer; (ii) means for storing the second audio sample in the received data frame in the second buffer in shift register configuration format; (iii) means for determining if the data frame was properly received; and (iv) means for selecting an audio sample for audio output, wherein the first audio sample in the data frame is selected if the data frame was properly received, otherwise, an audio sample from the end of the second buffer is selected.

The present invention also provides a method of providing uninterrupted radio operation, comprising the steps of: (a) receiving a digital audio sample from an audio source; (b) storing the audio sample in a first buffer having a length, a beginning and an end, wherein audio samples are stored in the first buffer in shift register configuration format; (c) constructing a data frame including a first audio sample from the end of the first buffer and a second audio sample from the beginning of the first buffer; (d) transmitting the data frame; (e) receiving the transmitted data frame; (f) storing the second audio sample in the received data frame in the second buffer, the second buffer having a beginning, and end and a length identical to the length of the first buffer, wherein audio samples are stored in the second buffer in shift register configuration format; (g) determining if the data frame was properly received; and (h) selecting an audio sample for audio output, wherein the first audio sample in the data frame is selected if the data frame was properly received, otherwise, an audio sample from the end of the second buffer is selected.

DRAWINGS

These and other features, aspects and advantages of the present invention will become understood with reference to the following description, appended claims and accompanying drawings where:

DESCRIPTION

Figure 1:
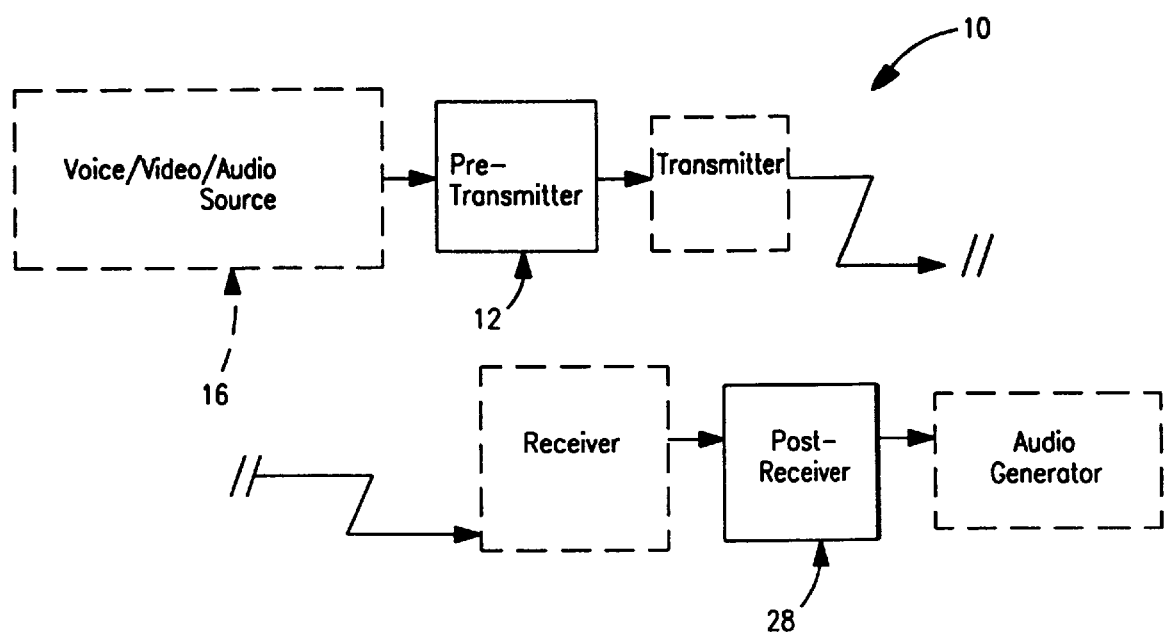
FIG. 1 illustrates a block diagram of an embodiment of a communication system according to the present invention.
Figure 2:
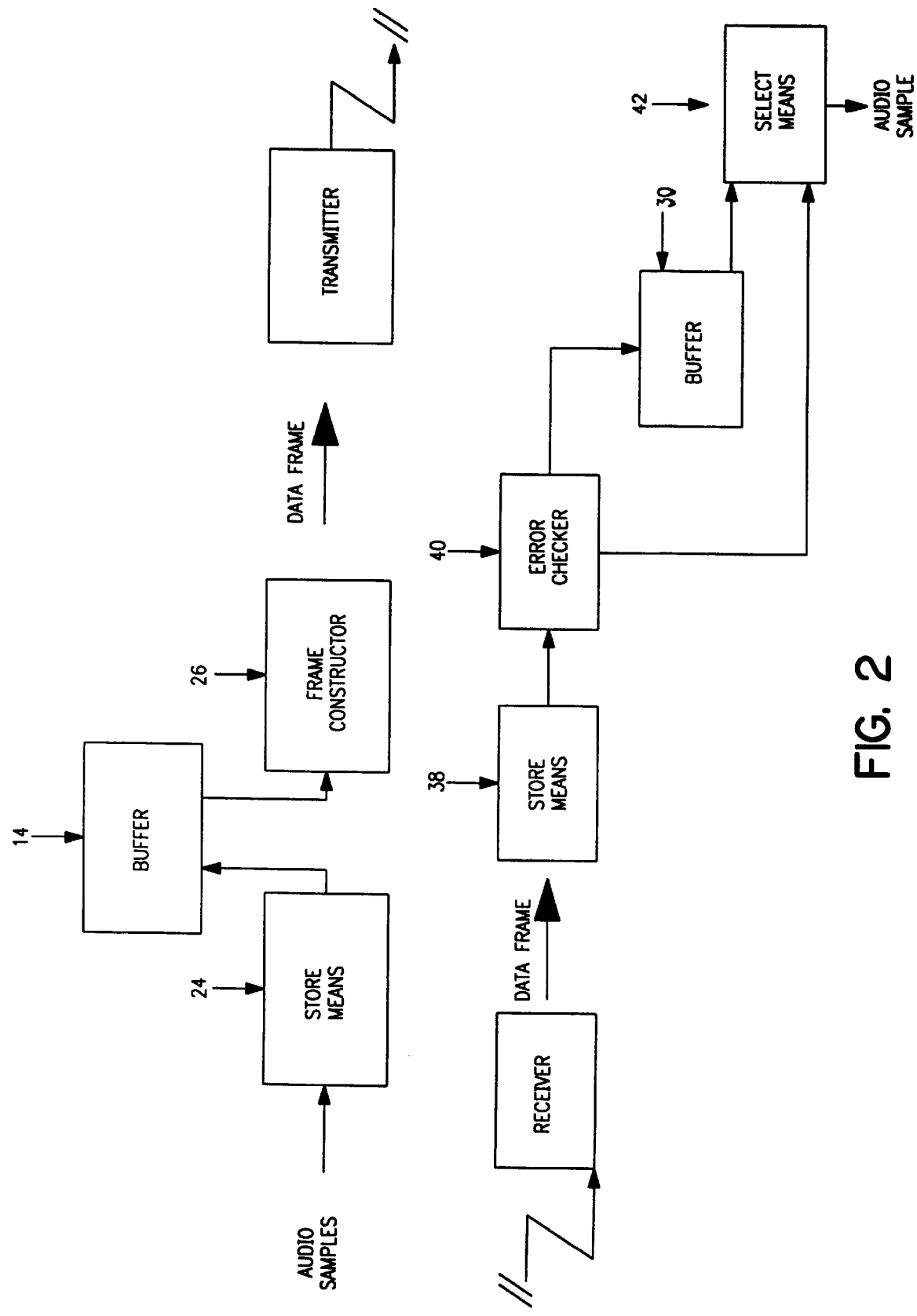
FIG. 2 is a detailed block diagram of embodiments of the pre-transmitter and post-receiver systems of FIG. 1.
Figure 3:
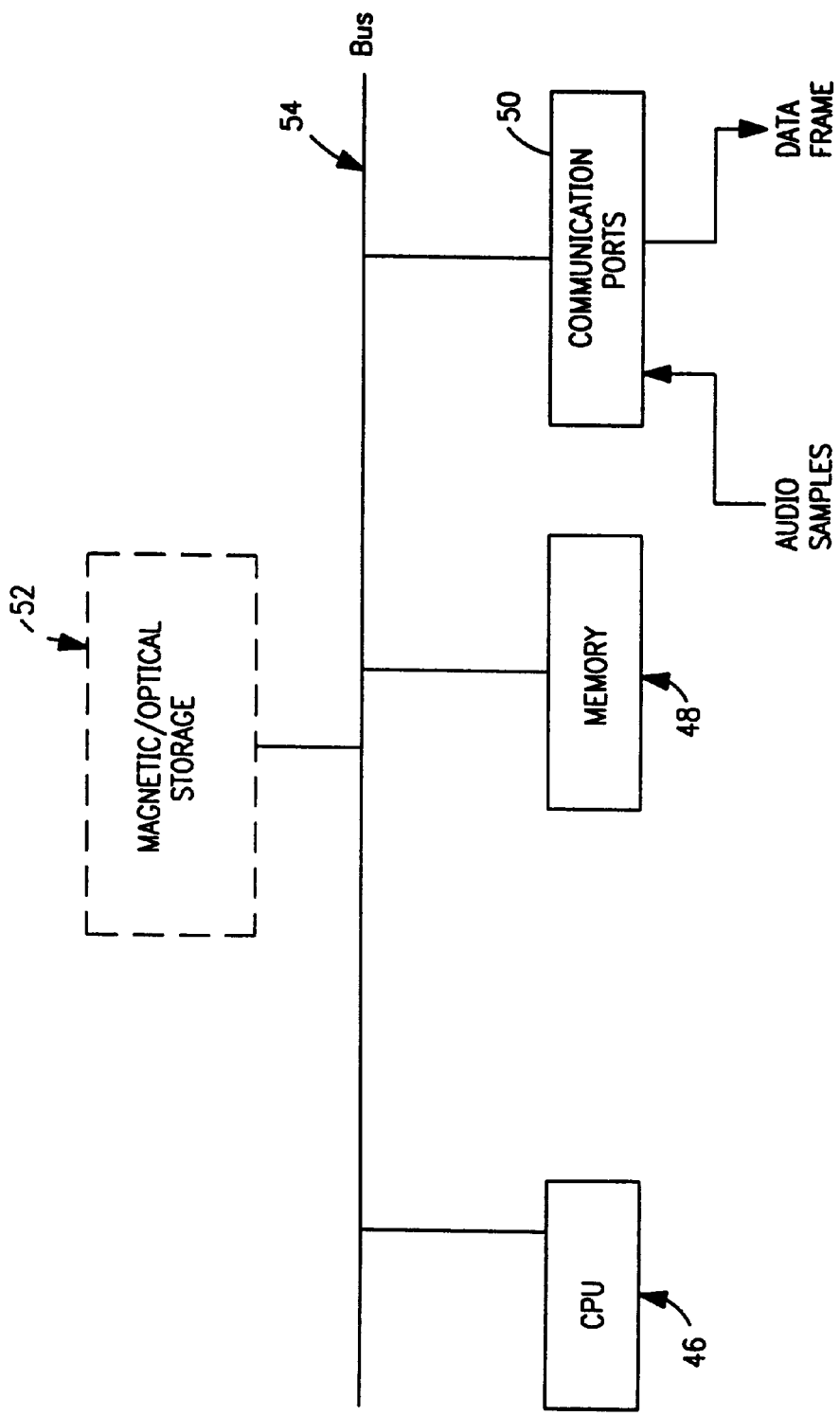
FIG. 3 illustrates the architecture of the pre-transmitter of FIG. 2.
Figure 4:
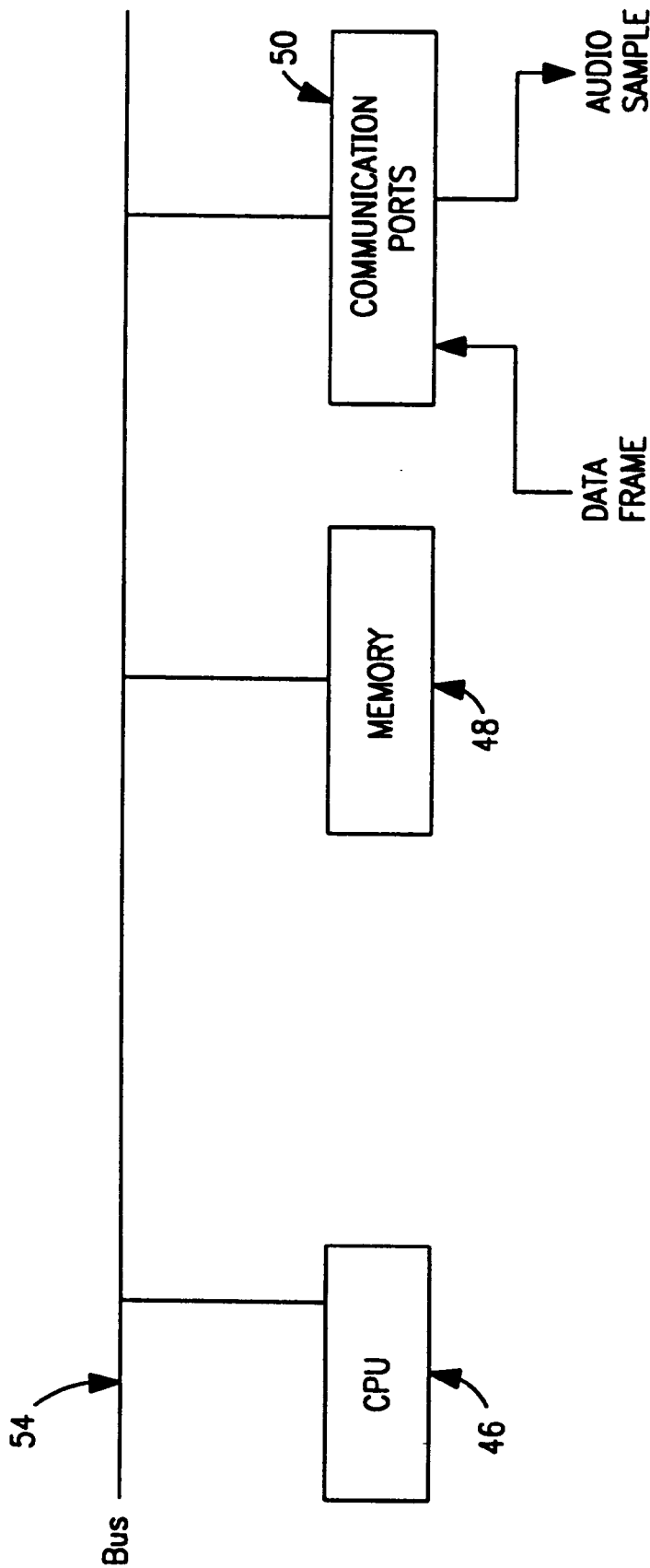
FIG. 4 illustrates the architecture of the post-receiver system of FIG. 2.
Figure 5:
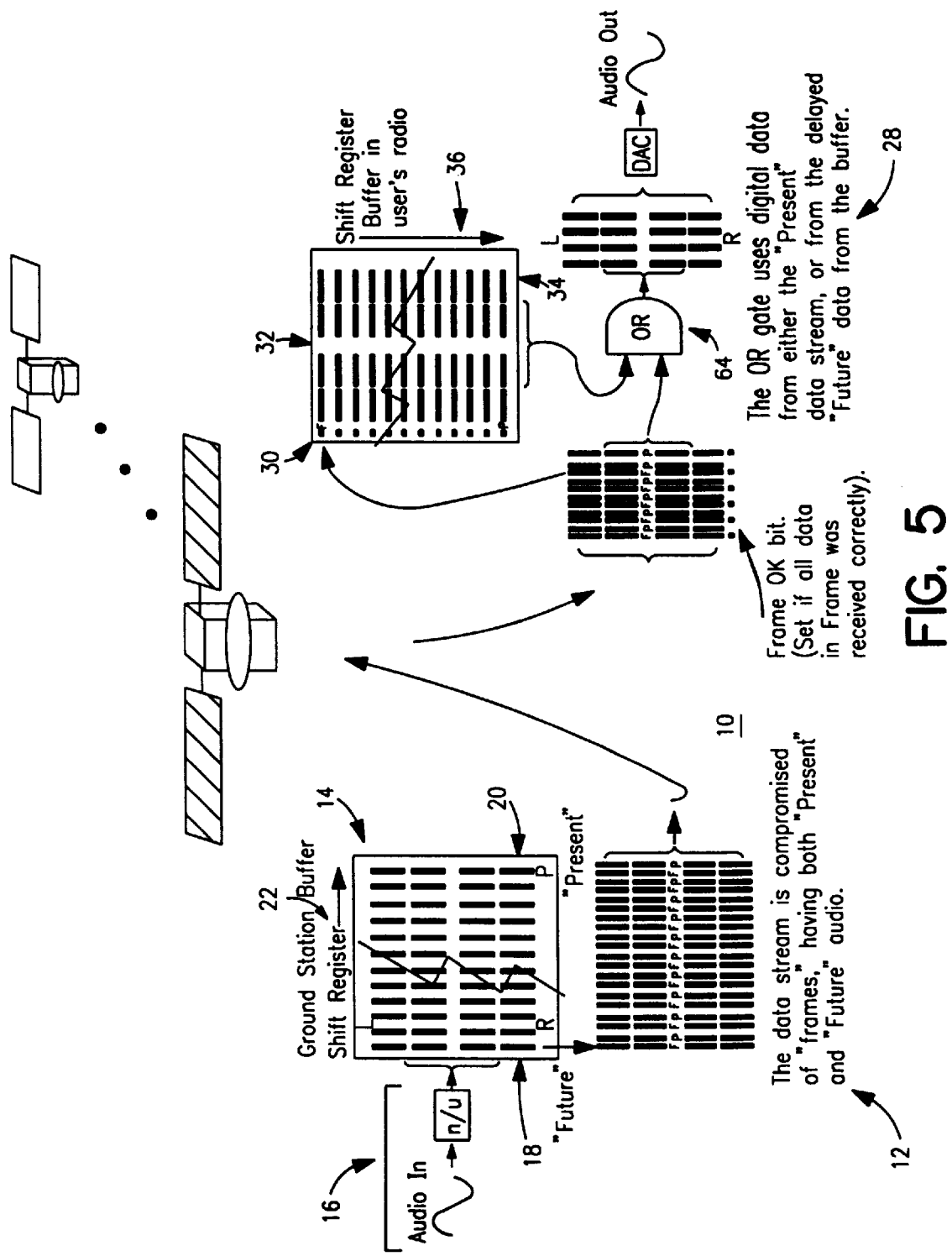
FIG. 5 is an overall block diagram.

Referring to FIGS. 1–5, an embodiment of a communication system 10 for providing uninterrupted radio operation according to the present invention is shown. The system 10 comprises a pre-transmitter system 12 including: (i) a first buffer 14 for storing a sequence of digital audio samples from an audio source 16, the first buffer 14 having a beginning 18, and end 20 and a length 22; (ii) storing means 24 for storing the audio samples in the first buffer 14 in shift register configuration format; and (iii) frame construction means 26 for constructing a data frame including a first audio sample from the end 20 of the first buffer 14 and a second audio sample from the beginning 18 of the first buffer 14. The data frame can be transmitted and received by a receiver.

The communication system 10 further comprises a post-receiver system 28 including: (i) a second buffer 30 having a beginning 32, and end 34 and a length 36 identical to the length 22 of the first buffer 14; (ii) storing means 38 for storing the second audio sample in the received data frame in the second buffer 30 in shift register configuration format; (iii) means 40 for determining if the data frame was properly received; and (iv) selection means 42 for selecting an audio sample for audio output, wherein the first audio sample in the data frame is selected if the data frame was properly received, otherwise, an audio sample from the end 34 of the second buffer 30 is selected. If neither sample is "good," then a null sample (e.g., all bits set to 0) is injected into the data stream, and no audio will be produced (an unavoidable dropout occurs). Alternatively, instead of a null sample, the last or previous sample can be injected into the data stream when only a few data samples are corrupt. Other alternatives include an interpolation scheme, or a gentle ramp up/down to null (0) when a stream of samples is missing to avoid a transient "pop" sound in audio output.

The pre-transmitter system 12 can be implemented utilizing a general purpose computer system programmed with instructions for performing the steps of the method of the present invention described below. Typically, a general purpose computer system 44 includes a central processing unit (CPU) 46, memory 48, communication ports 50 and optionally, magnetic or optical storage 52 interconnected through a bus 54. The first buffer 14 can be implemented as a ring buffer using address pointers in memory. The storing means 24 for storing audio samples into the first buffer 14 can be a set of program instructions providing buffer operations including insertion, deletion and shifting. Audio samples arrive at the communication port 50 of the computer system 44 and are inserted into the first buffer 14 by the storage means 24 via the bus 54.

The frame construction means 26 for constructing a data frame can be a set of program instructions for copying data samples from the end 20 and the beginning 18 of the first buffer 14. The data frame can be stored in a segment of the memory 48 for output through the communication port 50 via the bus 54. An example embodiment of a set of pseudo program instructions for implementing the means for storage and the means for constructing a frame of data is discussed in Example I below.

The pre-transmitter system 12 can also be implemented utilizing a dedicated logic system. In such a system the first buffer 14 can be a memory shift register clocked at a desired rate for receiving audio samples and providing audio samples for transmission at that clock rate. The first buffer 14 can also be implemented with pointers and conventional memory if preferred. Example II below describes an example embodiment of a dedicated logic system.

The post-receiver system 28 can be implemented utilizing a general purpose computer system 44, described above, programmed with instructions for performing the steps of the method of the present invention described below. The second buffer 30 can be implemented as a ring buffer using address pointers in memory. The storing means 38 for storing audio samples into the second buffer 30 can be a set of program instructions providing buffer operations including insertion, deletion and shifting. Data frames arrive at the communication port 50 of the computer system 44, and the second audio sample in each data frame is inserted into the second buffer 30 by the storage means 40 via the bus 54.

The means 40 for determining whether a data frame has been properly received can be implemented by assigning a "Frame OK bit" to each Frame. By examining either the analog signal strength received or error-detection information embedded in the digital data (e.g., parity, checksum, CRC, etc.) or some combination of these, the post-receiver can establish the fidelity of data in a Frame. If no errors are detected, the Frame is assigned a "good" flag in its "OK bit," and if not, the bit is set to "bad." This "OK" bit is carried along with the samples through subsequent processing. An example embodiment of a set of pseudo program instructions for implementing the storing means 38, the means 40 for determining and the means 42 for selecting is discussed in Example I below.

The post-receiver system 28 can also be implemented utilizing discrete logic elements or chips, a gate array, or by using an embedded microprocessor CPU and ROM microcode. The second buffer 30 can be a memory shift register clocked at a desired rate for receiving audio samples and providing audio samples for transmission at that clock rate. The second buffer 30 can also be implemented with pointers and conventional memory if preferred. Example II below describes an example embodiment of a dedicated logic system.

FIGS. 6–12 illustrate an example embodiment of the operational steps of the system 10 of FIGS. 1–4 for a sequence of transmission events from a transmitting ground station via a satellite to a receiving ground station. An audio source generates digital samples (e.g., two 16 bit channels, or 4 bytes per sample) which are received by the pre-transmitter system 12 and fed into the first buffer 14. As each new sample arrives, all of the samples in the buffer 14 are shifted along simultaneously, in shift register configuration format. The buffer 14 has an input 56 where new samples are inserted into the buffer, and an output 58 where samples are shifted out of the buffer. As such, the beginning 18 of the buffer 14 is at the input 56, and the end 20 of the buffer 14 is at the output 58. The length 22 of the buffer 14 determines the maximum number of digital samples that can be stored in the buffer 14 at any time.

After an initial startup period, the buffer 14 is always full, and continues to migrate samples from its input 56 ("Future" sample) to its output 58 ("Present" sample). "Present" and "Future" are relative times referred to by a user radio as described below. The length 22 of the buffer 14 and the shift clock rate determine the time delay between "Present" and "Future" samples. This delay period amount can be determined for a specific embodiment such that performance is optimal for the desired operating scenarios.

At each clock cycle (sample period), a "frame" of data is constructed for transmission via a transmission medium such as a satellite. The data frame consists of both a "Future" ("F") sample, and a "Present" ("P") sample (one delayed in time by the buffer). Thus, a stream of data is transmitted via an uplink consisting of pairs of samples, one "Future," one "Present," at every sample period. In this embodiment the effective data volume (bit rate) for transmission has doubled. The satellite then retransmits the data stream via a downlink to a receiver, such as a user radio, in which the stream of sample pairs (Present and Future) is reconstructed from the data frames by the post-receiver system 28 according to the present invention.

At the post-receiver system 28, a "Frame OK bit" is assigned to each data frame to indicate whether the data frame has been properly received. This can be implemented by examining either the analog signal strength received or error-detection information embedded in the digital data (e.g., parity, checksum, CRC, etc.) or a combination. Thus, the post-receiver system 28 can establish the fidelity of data in a data frame. If no errors are detected, the data frame is assigned a "good" flag in its "OK bit," and if not, the bit is set to "bad." The "OK" bit is carried along with the samples through subsequent processing.

The second buffer 30 has an input 60, corresponding to the beginning 32 of the buffer 30, and an output 62 corresponding to the end 34 of the buffer 30. At the post-receiver system, the Future samples are split off and injected into the input 60 of the second buffer 30. The length 36 of the buffer 30 (delay time) matches that of the first buffer 14 in the pre-transmitter system 12. As time progresses, samples migrate through the second buffer 30, until at the output 60 of the buffer 30 they are identical to the Present samples from the incoming data stream. The "OK" bits are preserved along with the samples as they flow through the buffer 30.

In this embodiment, the selection means 42 includes an "OR" switch 64, utilized to select a data sample from the incoming real-time Present data samples or from the second buffer 30 for audio generation. Selection depends on the "OK" bits of the data samples. If the real-time sample "OK bit" is "good," then the real-time Present sample is selected. If not, the delayed Present sample is selected (assuming its OK bit is "good"). If neither sample is "good," then a null sample (e.g., all bits set to 0) is injected into the data stream, and no audio will be produced (an unavoidable dropout occurs). Alternatively, instead of a null sample, the last or previous sample can be injected into the data stream when only a few data samples are corrupt. Other alternatives include an interpolation scheme, or a gentle ramp up/down to null (0) when a stream of samples is missing to avoid a transient "pop" sound in audio output.

Figure 6:
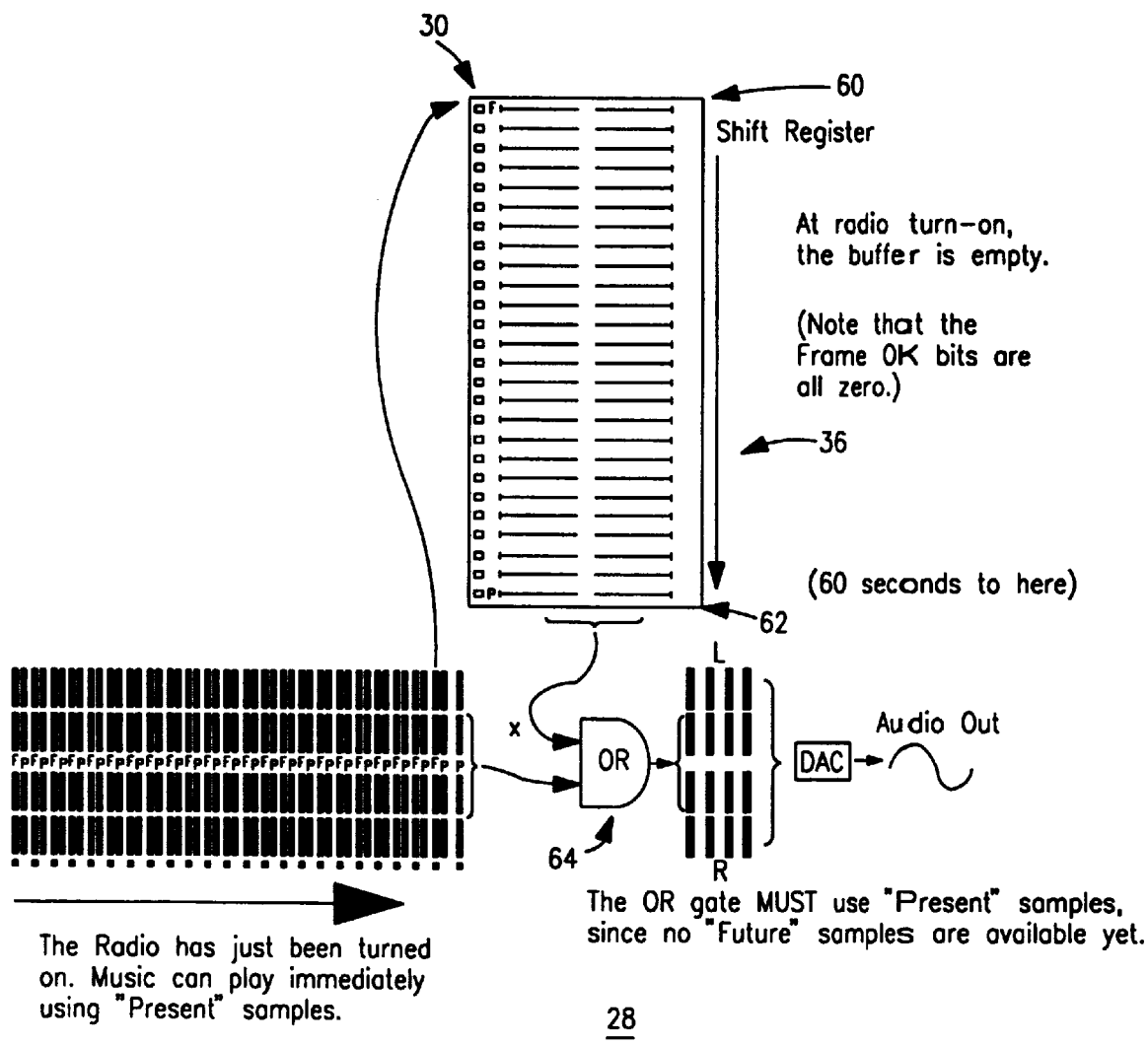
FIGS. 6–12 illustrate the operational steps of the system of FIG. 1 for a sequence of transmission events.

FIG. 6 provides a more detailed view of the post-receiver system 28 operation. Initially, when a radio containing the post-receiver system 28 is first turned on, the buffer 30 is empty and all of the OK bits in the buffer 30 are initialized to 0. Thus, only the real-time incoming Present samples are available as valid samples to the OR switch 64. As such, advantageously, there is no delay in radio operation (audio output) when it is first turned on. This is in contrast to bit interleaving schemes which must wait until all memory is filled before audio output can begin. For the embodiment discussed here, a buffer length (time delay) of 60 seconds is assumed.

Figure 7:
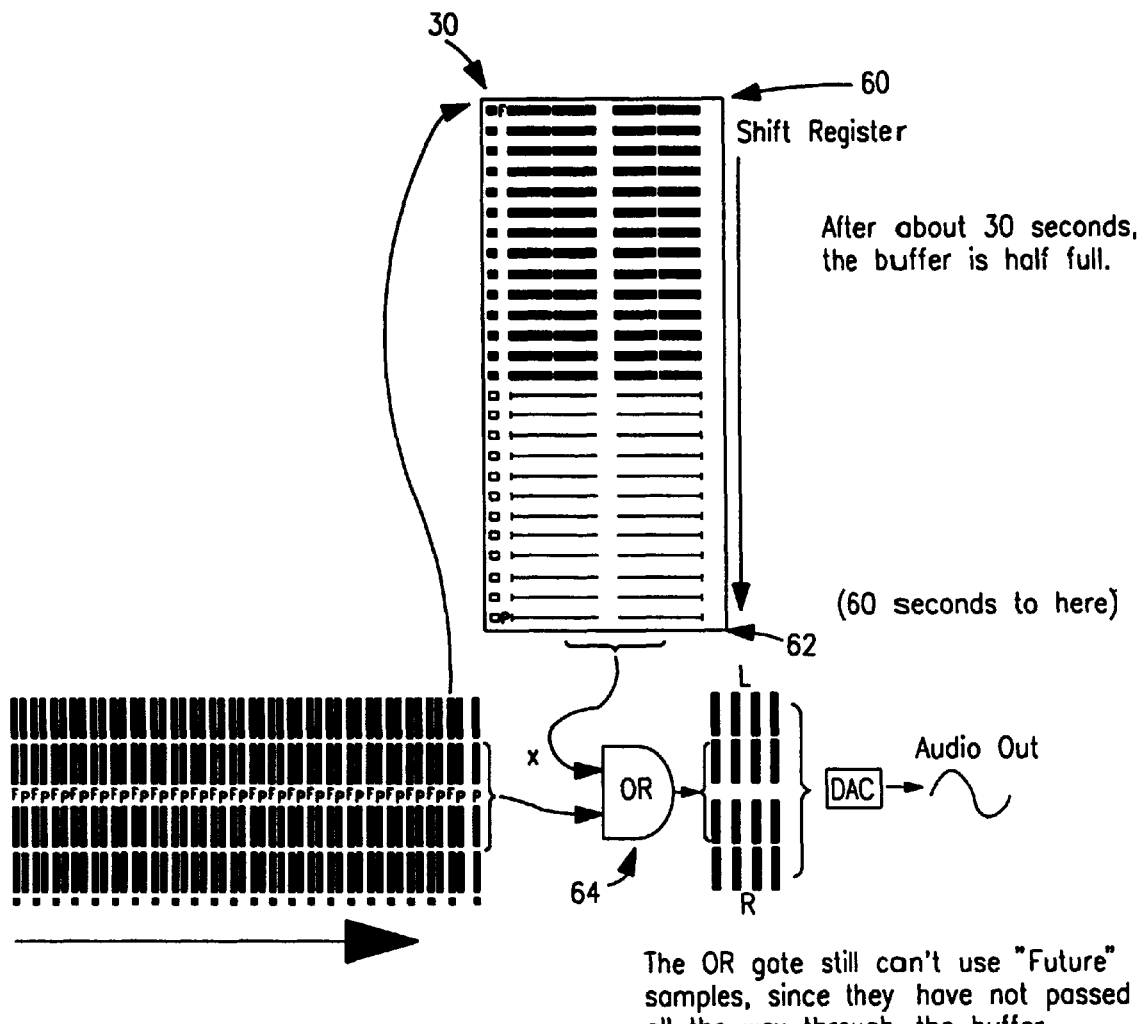

FIG. 7 illustrates the status of the post-receiver system 28 a short time after it has been turned on (e.g., 30 seconds). The buffer 30 has begun to fill up with good "Future" samples in the buffer 30. The OR switch 64 still has only "Present" samples available as valid data.

Figure 8:
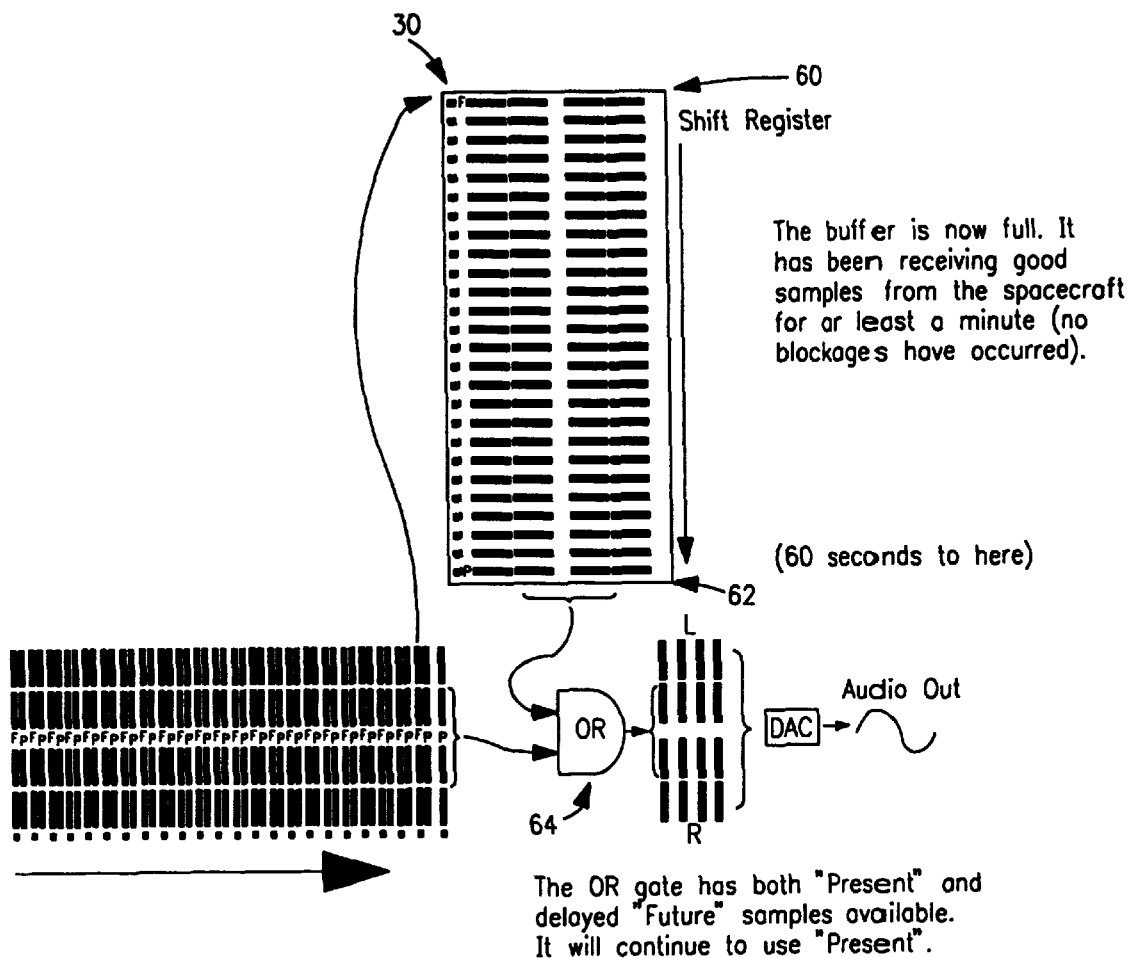

FIG. 8 illustrates the status of the post-receiver system 28 after an initial 60 seconds after radio turn-on and continual reception of a good signal. The buffer 30 is now full with valid samples, and is able to provide the OR switch 64 with valid delayed "Present" samples.

Figure 9:
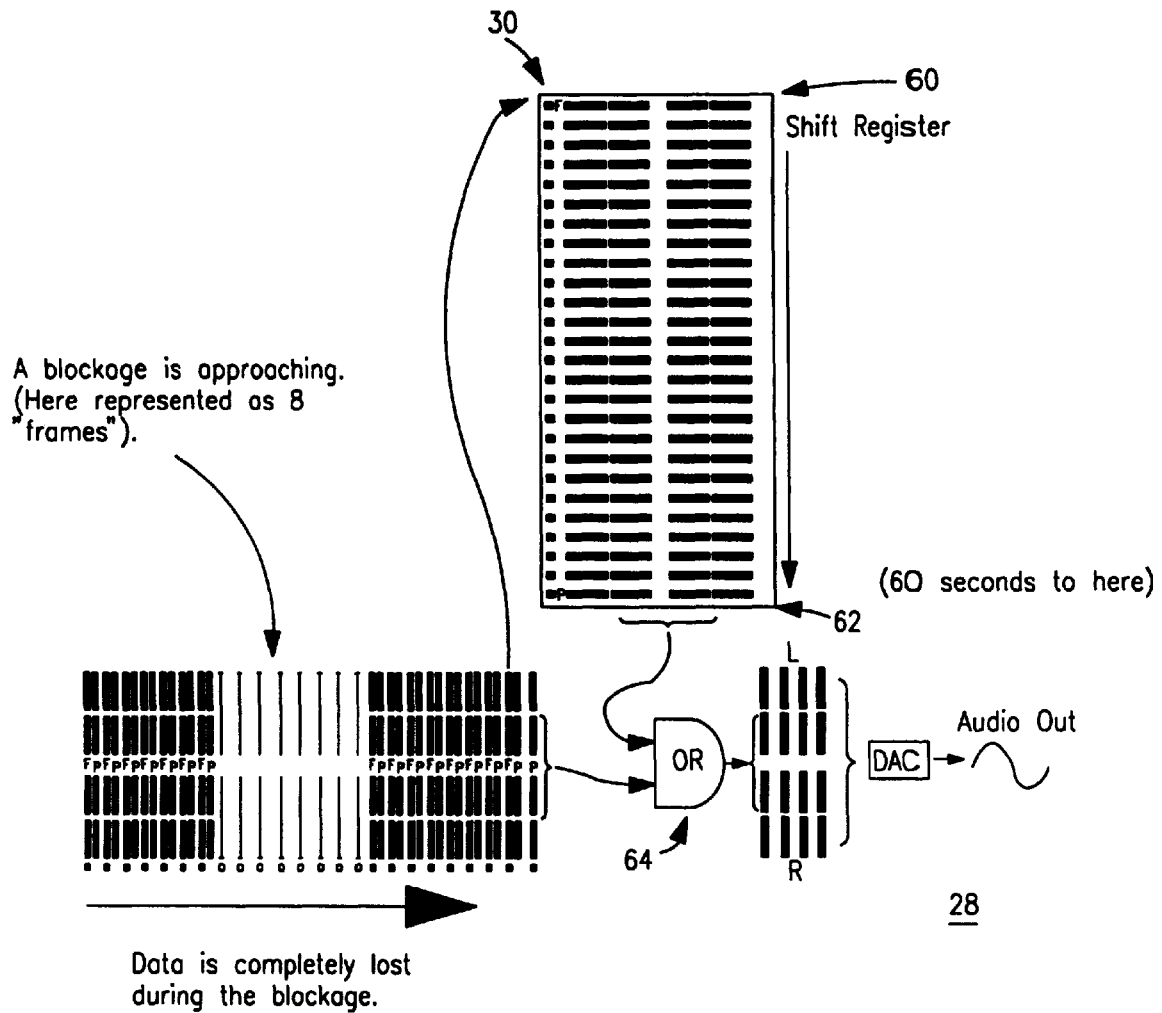

FIG. 9 illustrates a blockage encountered by the post-receiver system 28, causing a section of lost samples in the incoming data stream from the satellite.

Figure 10:
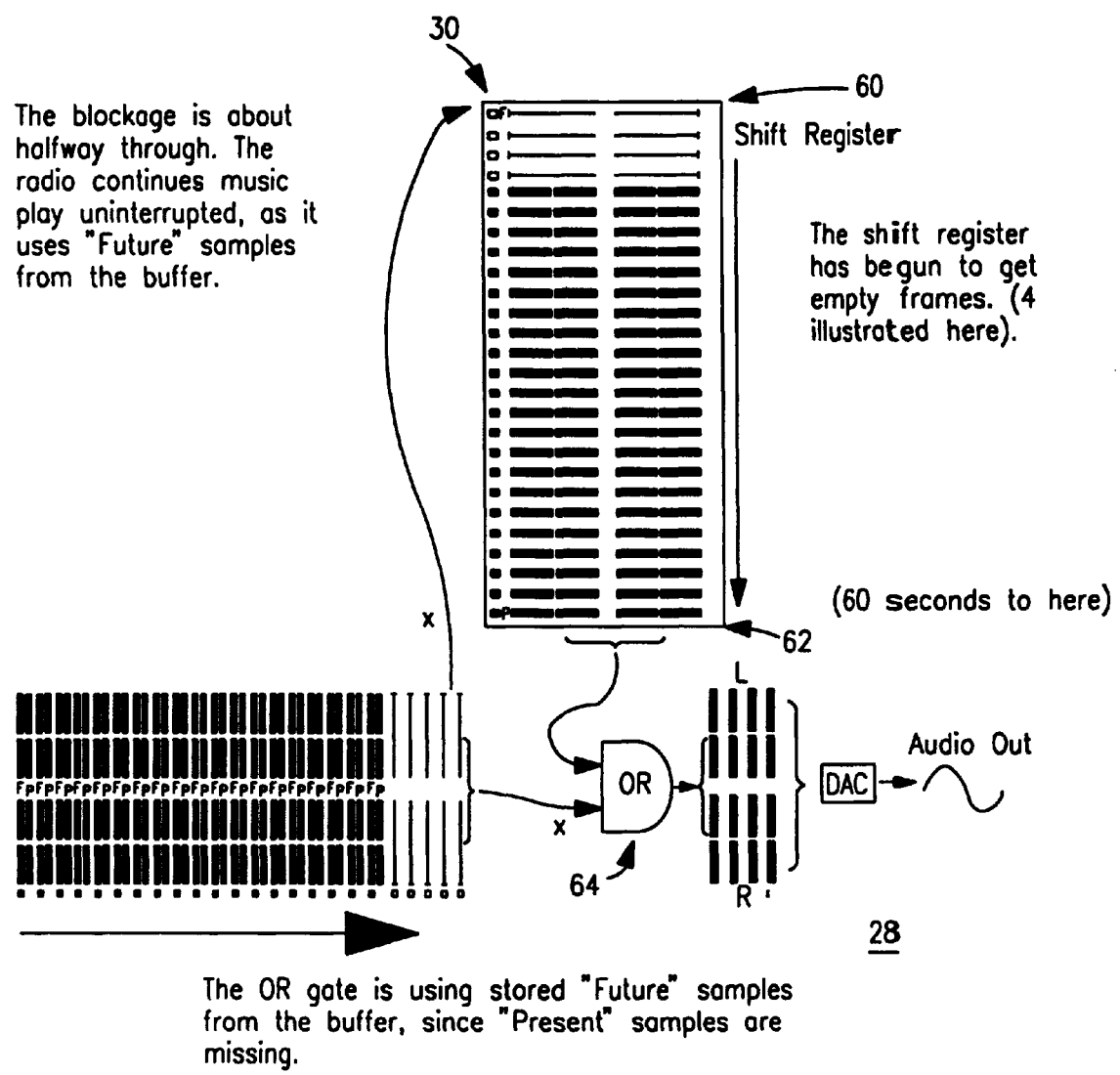

FIG. 10 shows the blockage about halfway through its travel in the system 28. The real-time Present samples are invalid. The paired Future samples are also invalid as they are inserted into the input 60 of the buffer 30. However, advantageously, the OR switch 64 has good delayed-Present samples available from the output 62 of the buffer 30, and the radio continues producing audio even though the incoming signal has been completely blocked for an extended period. The sample buffer length discussed for this example embodiment can produce audio for blockages for as long as a full minute, as might be encountered at a stoplight or while driving through a tunnel.

Figure 11:
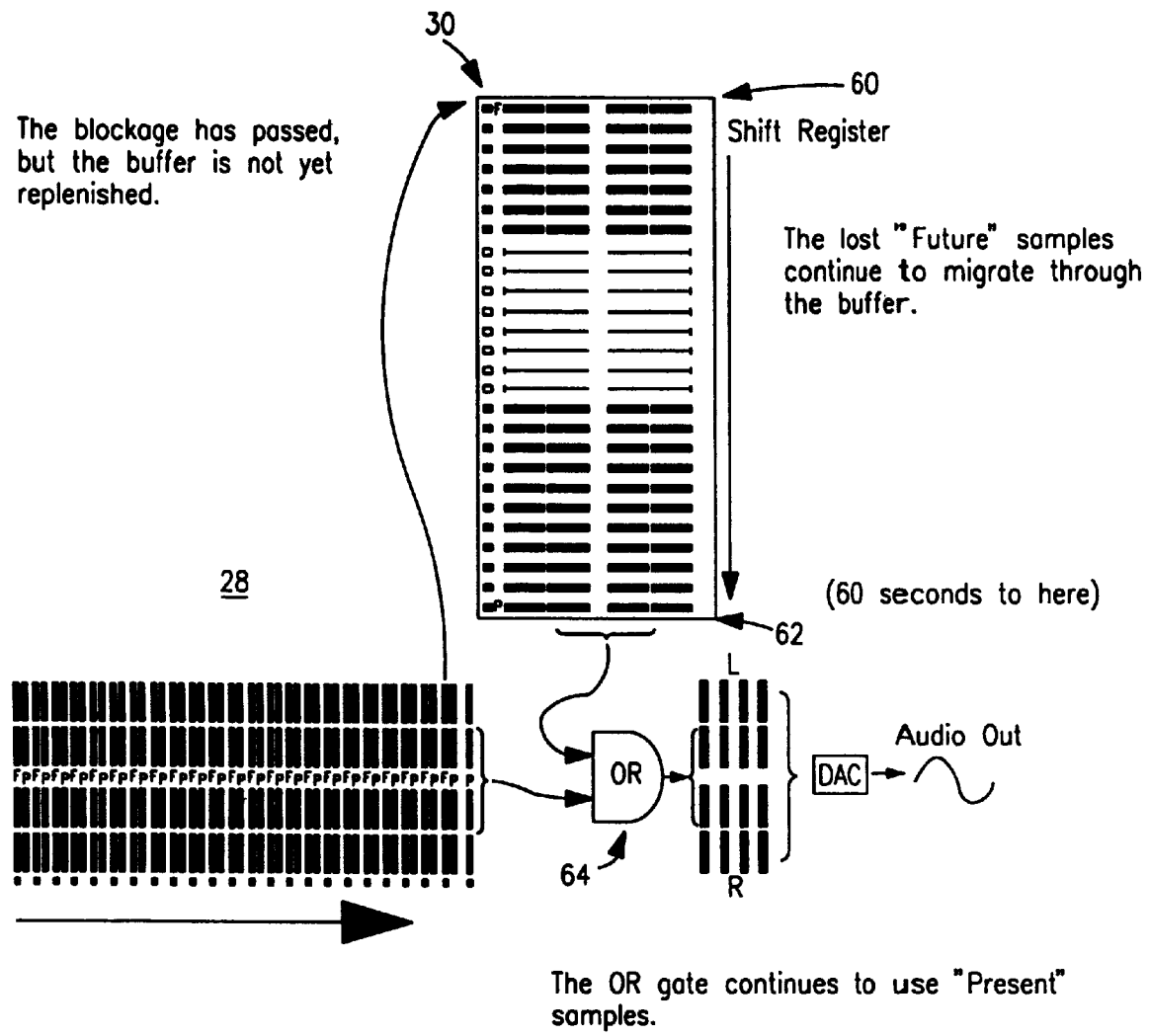

FIG. 11 shows the blockage after it has passed, and good samples are again being received. The bad Future samples resulting from the blockage have passed about midway through the buffer 30. Radio audio is still being produced, since the OR switch 64 has good Present samples available from real-time reception.

Figure 12:
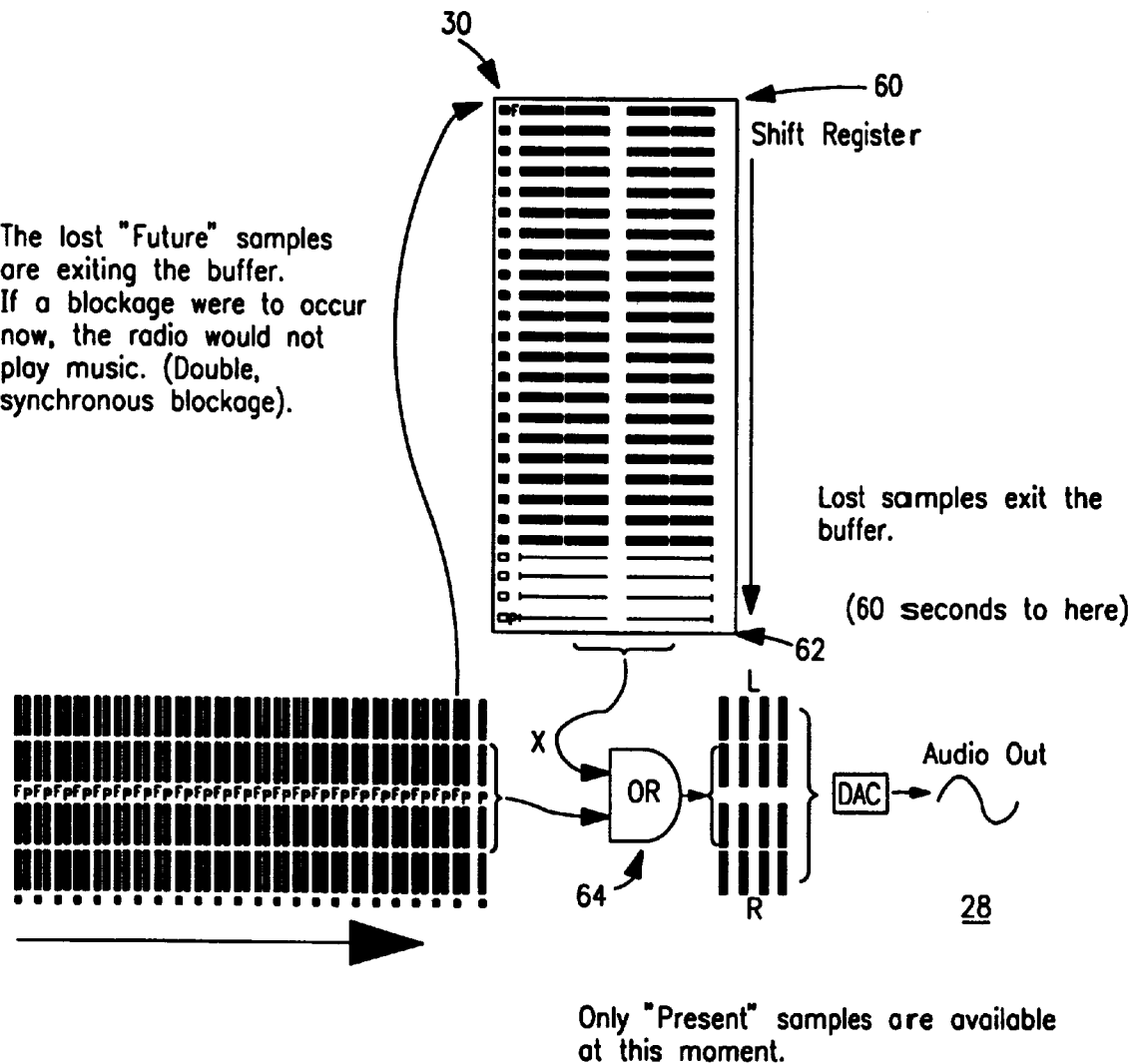

FIG. 12 shows the status of the post-receiver system 28 as the blockage samples in the buffer 30 exit the buffer 30 about a minute after the blockage occurred.

Figure 13:
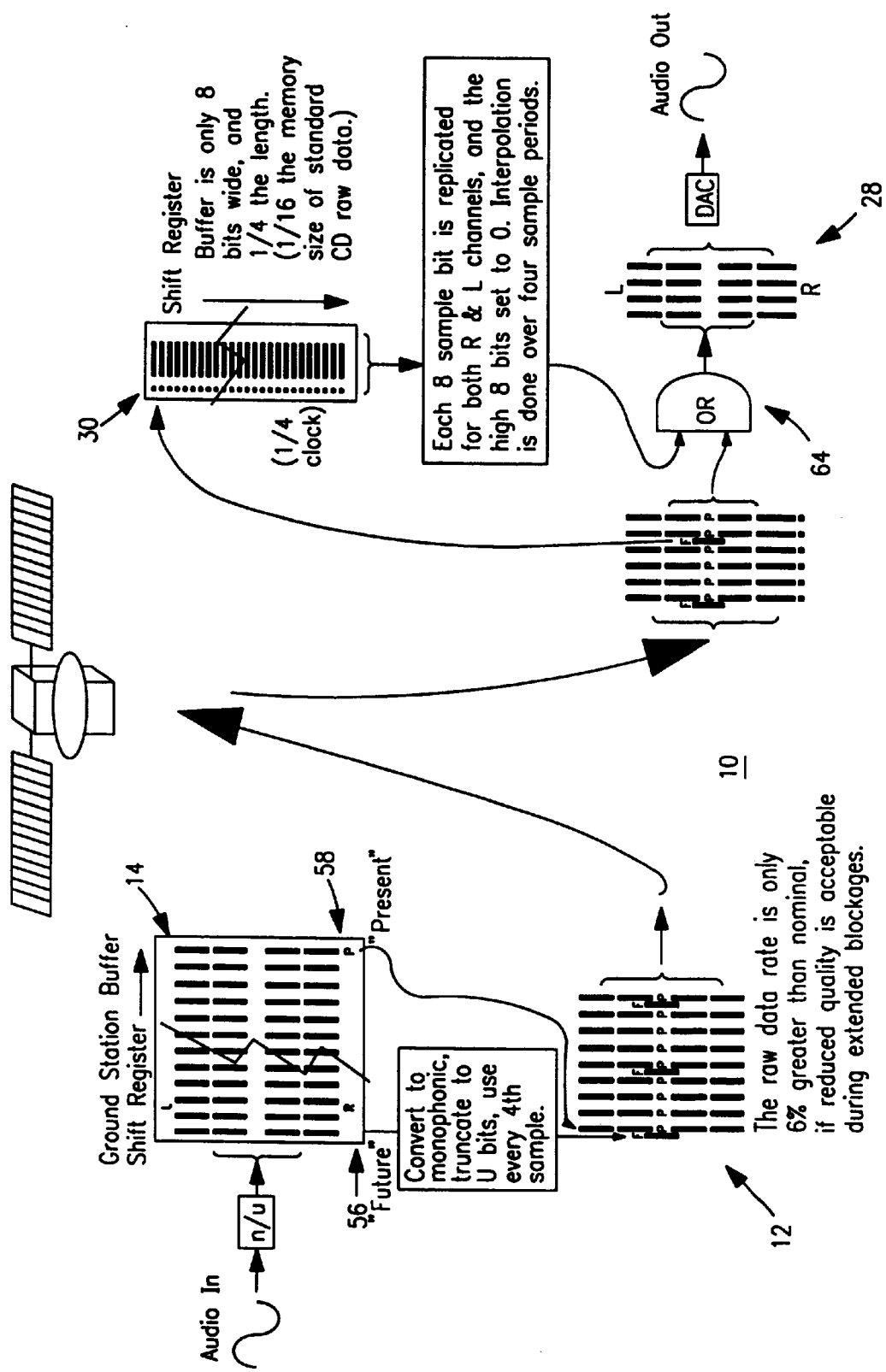
FIG. 13 illustrates another embodiment of a communication system according to the present invention.

FIG. 13 illustrates an example implementation of another embodiment of the communication system 10 of the present invention. To reduce the size of the buffer 30 of the post-receiver system 28 and to reduce the communication link bit rate, the example embodiment shown in FIG. 11 incorporates the following three features by affecting the format of the "Future" samples transmitted: (1) Transmitting only monophonic audio to reduce the bit rate (and buffer storage size) by a factor of two; (2) Reducing the amplitude resolution of the Future samples from the nominal 16 bit resolution, with 8 bit amplitude resolution as a practical lower limit (a factor of two less in bit rate and storage), and 12 bit resolution as an intermediate choice (¾ the amount of transmitted data); and (3) Reducing the sampling period of Future samples by a factor of two (22 ksps) or 4 (11 ksps). Other values for the aforementioned reductions are possible and can be selected according to desired requirements.

In the system of FIG. 13, the Future samples are monophonic, 8 bits in amplitude resolution, and at an 11 ksps sampling rate (¼ of the nominal 44 ksps rate). The Future samples from the buffer 14 of the pre-transmitter system 12 are converted to monophonic (add the stereo signals, and divide by two), truncated to 8 bits (drop the high order, least significant byte), and reduced to one sample per every four of the nominal 44 ksps sample rate. The latter could be implemented by, for example, trapping the maxima/minima within alternating four sample sections. The resulting single byte is combined with the transmitted nominal 16 bit, 44 ksps stereo bit stream. The effective increase in bit rate is about 6% (17/16 bytes per Frame). As a result, advantageously, the user radio memory requirement is drastically reduced, by a factor of 16.

If the Future sample data is used by the OR switch 64 of the post-receiver system 28 during a blockage period, the delayed-Present data from the buffer 30 is converted to emulate the standard 16 bit, stereo 44 ksps audio data stream. The 8 bit data (byte) is used for both the right and left stereo channel, and a null (all 0) least significant byte is added to make 16 bit samples. The same samples could be replicated four times to get 44 ksps from the 11 ksps, or an "oversampling" algorithm, such as interpolation, could be applied for more sophistication.

The present invention also contemplates utilizing digital audio compression to reduce the length 36 of buffer 30 for a given time delay. For example, with a compression ratio of 12:1, maintaining essentially "CD quality" sound, the buffer memory requirement is reduced to about one megabyte in size. In the above example embodiments, the 60 second delay selected between Present and Future is arbitrary, and can be longer or shorter as desired in an actual specific design, as determined by the maximum blockage period to be accommodated.

Figure 14:
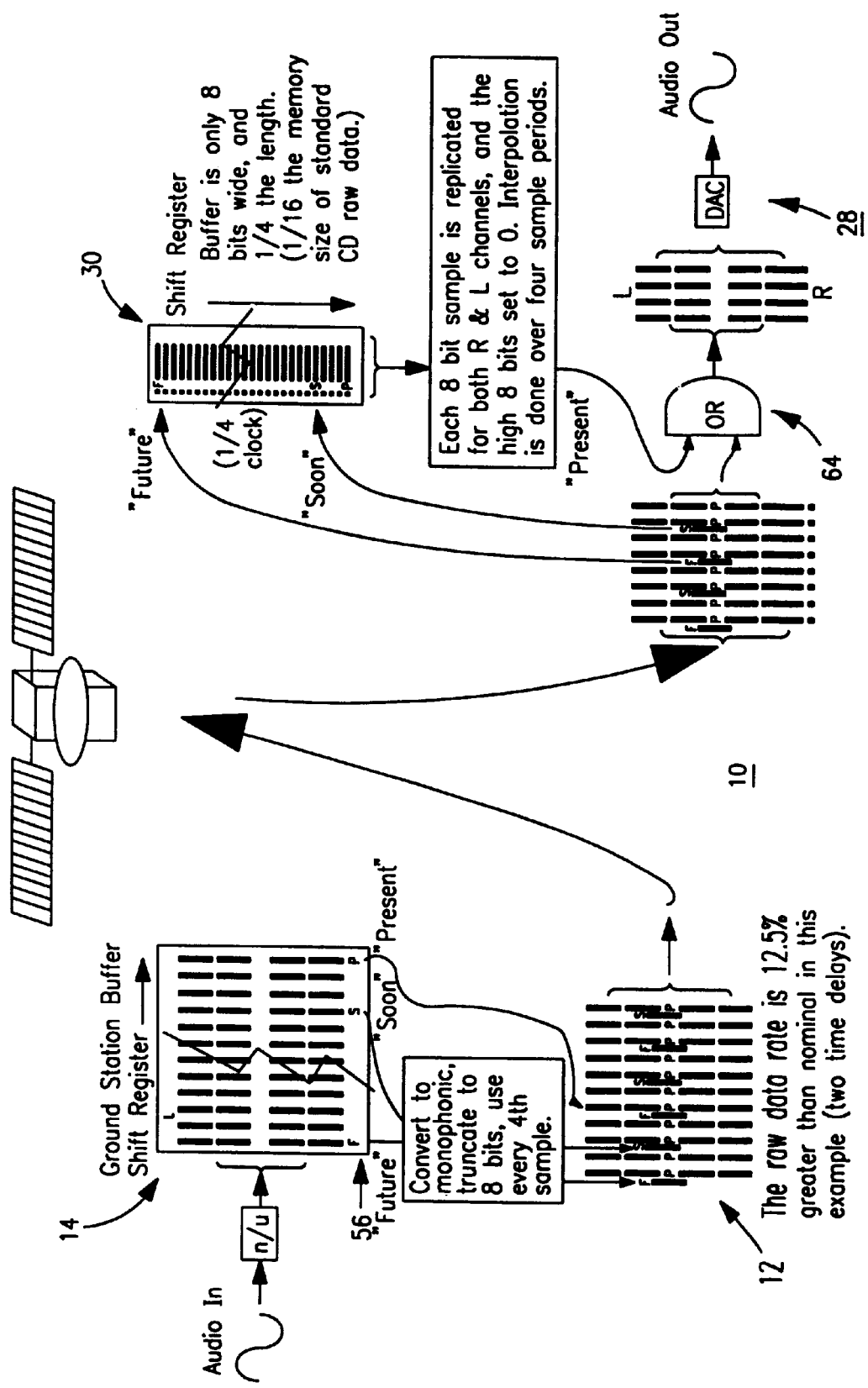
FIG. 14 illustrates another embodiment of a communication system according to the present invention.

FIG. 14 illustrates yet another embodiment of the present invention. In addition to the "Future" samples transmitted by pre-transmitter system 12, both the pre-transmitter and post-receiver buffers 14 and 30, respectively, are tapped at a shorter delay period, labeled "Soon." In the pre-transmitter 12, both the Future and Soon samples are included with Present samples to construct a data frame for transmission. With a monophonic 8 bit 11 ksps rate, the Soon samples (along with the Future samples) would increase the transmitted bit rate by only about 12.5 percent (approximately about 6% for Future and about 6% for Soon).

In the post-receiver system 28, both Future and Soon samples are stripped from the data stream frame, and the Future samples sent to the buffer input 60 as described above. The Soon samples are inserted into the buffer 30 at a point in the buffer corresponding to the delay of Soon samples in the pre-transmitter 12. The Soon sample can be inserted anywhere between Future and Present, such as close to Future, or in the middle of Present and Future. The insertion point depends on the specific nature of the blockage scenario a particular design is aimed at mitigating.

The Future and Soon samples are checked for validity and their OK bits set accordingly. If the Soon sample is invalid it is not sent to the buffer 30. If the present Sample is invalid, a delayed-Future sample during a blockage is used by the OR switch 64. In the system of FIG. 14, when short blockages occur, followed by short periods of good data, the buffer 30 is replenished rapidly below the Soon insertion point. Furthermore, if repetitive short blockages such as a row of telephone poles are encountered which are approximately synchronous with the total buffer delay, the Soon injections will prevent audio loss.

The system of FIG. 14 is advantageous for circumstances where both long and frequent short duration blockages are encountered. Objects such as telephone poles, street signs, and traffic lights produce relatively short but opaque blockages (fractions of a second). Overpasses, buildings, and passing traffic (large trucks) would typically result in relatively long blockages (several seconds). The system of FIG. 14 remedies the situation where repetitive blockages such as telephone poles are encountered which have a separation period approximating the nominal delay of the pre-transmitter and post-receiver buffers 14 and 30, respectively. Even though the blockages are short, audio loss can occur since blockages are synchronous with the lengths 22 and 36 of the buffers 14 and 30, respectively. This is because a new blockage is encountered just as the previous blockage exits the buffer 30 of the post-receiver 28, resulting in audio loss. The present invention also contemplates use of more than one tap spread optimally throughout the buffers 14 and 30.

Figure 15:
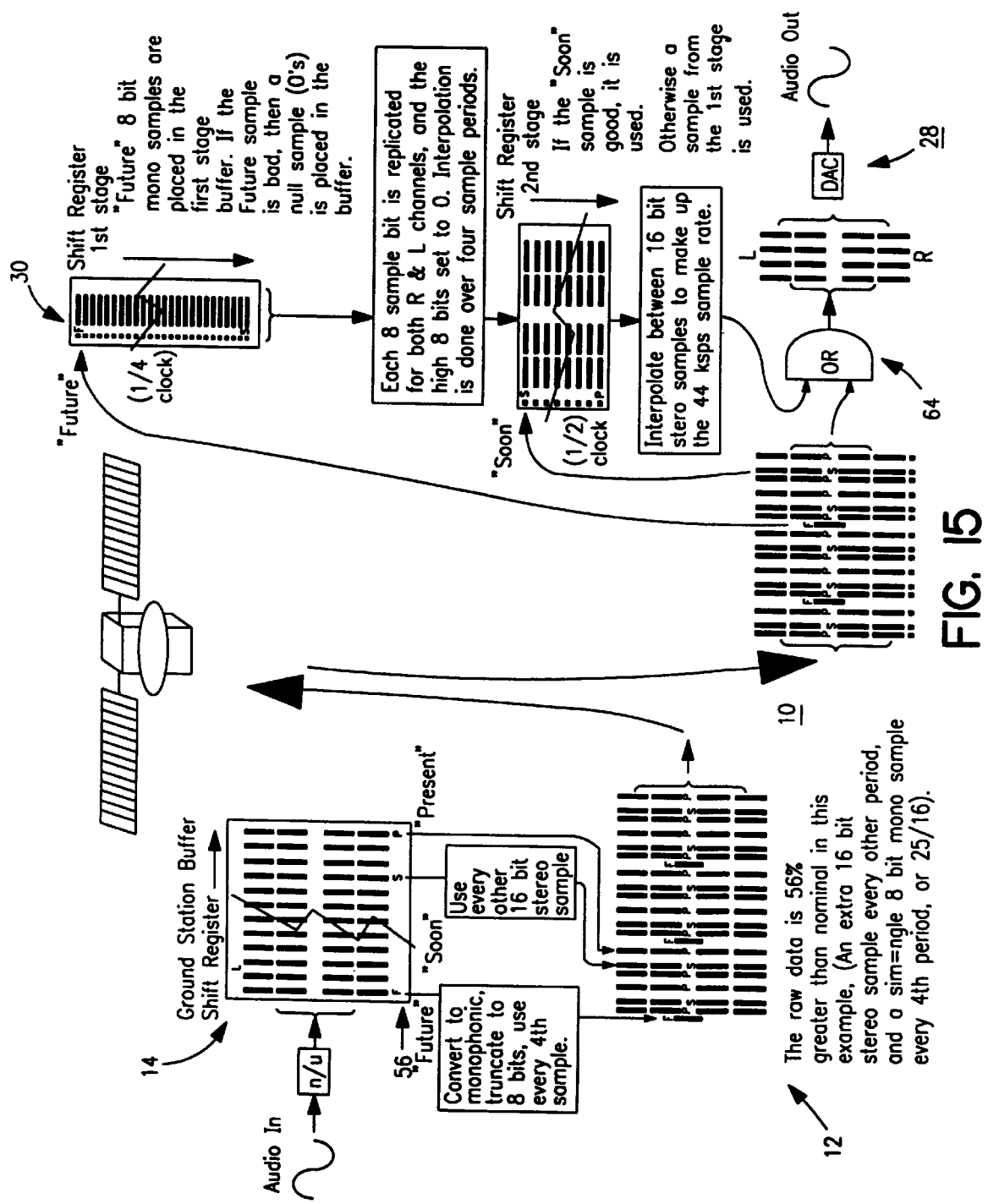
FIG. 15 illustrates yet another embodiment of a communication system according to the present invention.

FIG. 15 illustrates yet another embodiment of the present invention. The system of FIG. 15 is a hybrid design, where the Future samples are reduced in size (e.g., 8 bit monophonic at 11 ksps), but the Soon samples maintain nearly the same audio quality as the original data (e.g., CD 16 bit stereo samples at 22 ksps). As such, the system of FIG. 15 can be optimized for cost versus performance: short blockages would be unnoticed by the listener, while long blockages would have reduced audio quality but maintain operation. The post-receiver buffer 30 is split into two stages: The first stage handles the long duration blockages with the 8 bit monophonic Future samples, while the second stage handles the higher quality Soon samples.

In a transmission scenario where two or more satellites are employed to provide angular line-of-sight diversity, then, according to the present invention, the signal from the first satellite represents the Present samples, and the signal from the second satellite represents the Future data samples, and the signal from any additional satellites would have additional delay times, such as the Soon delay described. Note that if two or more satellites are used for Present and Future (or more taps of delay), there is no increase in communications link bit rate as there is with a single satellite and Present and Future (and Soon) combined in the same signal. The advantages of this invention can therefore be combined with systems utilizing two (or more) satellites without link rate impact (only the shift register buffer memory and associated logic is needed). By adding this invention to a two-satellite system, the nominal spatial diversity advantage of two satellites is significantly enhanced for obviously coincident (and not just random) blockage situations, such as a bridge overpass (both satellites are definitely blocked). This aspect of the invention can also be utilized in transmission systems using low or medium altitude satellite constellations which require many satellites for global continuous coverage besides line-of-sight coverage.

The present invention also contemplates: (1) Terrestrial radio transmissions not utilizing satellite systems which also suffer from blockage scenarios; (2) Transmission systems such as optical links which do not utilize RF including transmission of all types of digitized electromagnetic signals; (3) Satellite-to-mobile-user data systems which include the PCS (Personal Communicator Satellite) systems for beepers, facsimile, Internet, "telegrams," electronic mail, etc. Such systems include systems for communication of traffic, weather or other graphically-oriented information that is continuous but may encounter dynamic blockages. Examples include systems for a dashboard display of position, traffic, and weather; and (4) Video (TV) direct broadcast systems, including any mobile and stationary receipt of TV signals when reception is intermittently obscured. Existing TV satellite receiver systems function as long as the dish has a clear view of the satellite, but fail temporarily in the presence of heavy rainfall (cloudburst). The present invention can be utilized to alleviate such problems by, for example, utilizing a disk storage (e.g., hard disk) for storing Future (or Soon) video in a home satellite TV receiver.

The present invention, advantageously, eliminates a severe disadvantage of existing direct satellite broadcasting to mobile radio systems. It provides conventional radio performance for satellite radios without frequent annoying losses of audio. The system can also be utilized in various industries such as commercial trucking and military applications.

EXAMPLE I

An example embodiment of a set of pseudo-code instructions for the pre-transmitter 12 and post-receiver 28 of the present invention is described below.

Pre-transmitter Data Operations (Ground Station)

The following pseudo-code occurs (loops) at every clock cycle, here assumed as 44, 100 Hz, the same as the standard CD music format PCM sampling rate. It is assumed that a programmable hardware clock (a chip having a down-counter and oscillator time base reference), is set up to send an interrupt which the software program can detect, and that a new stereo, 16 bit audio sample will be available from the music feed at each clock cycle. A different system-clock/synchronization scheme and packing additional data into the stream besides a single audio source are also possible.

Figure 16:
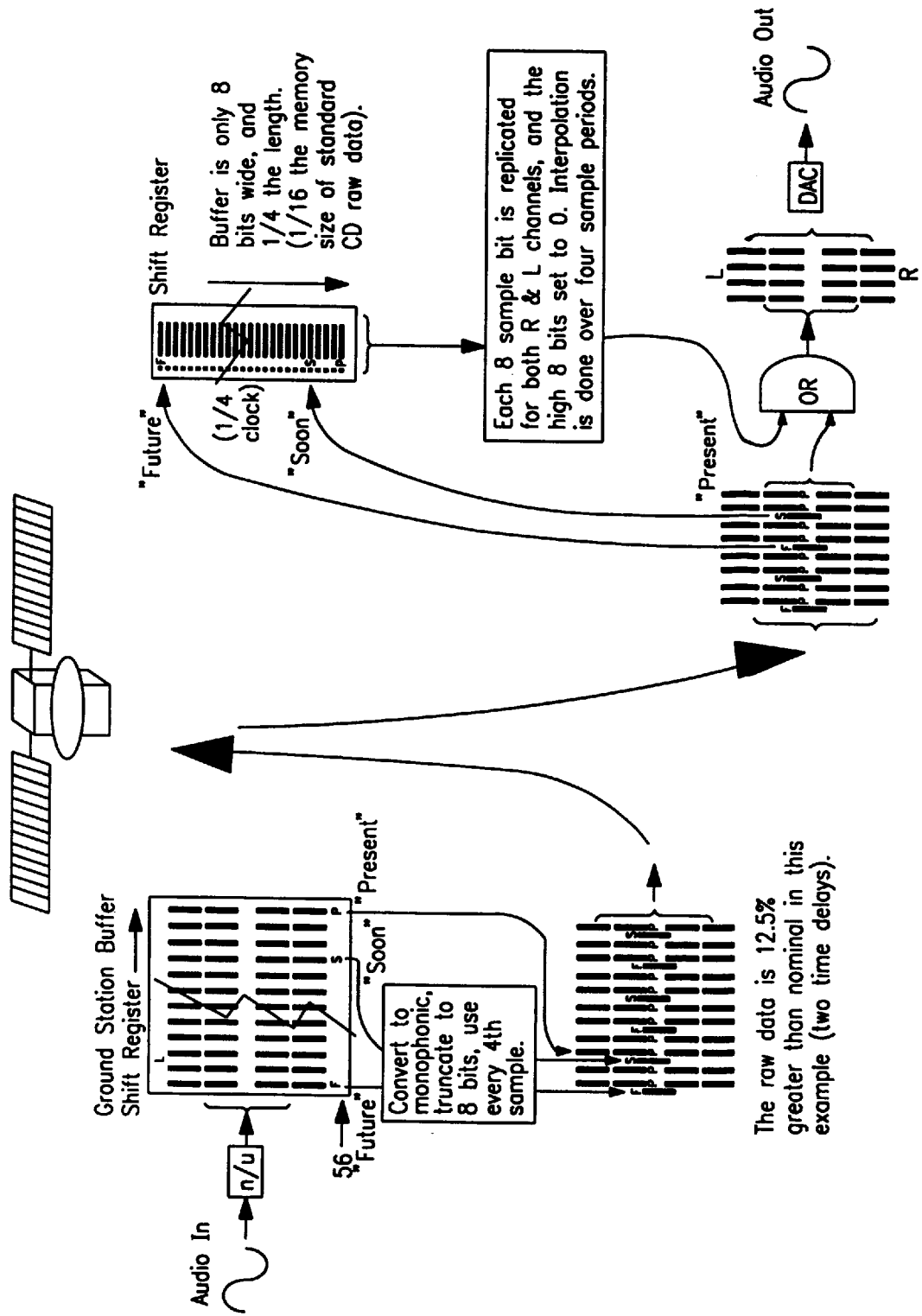
FIG. 16 illustrates another embodiment of a communication system according to the present invention.

The "Transmitter" referred to in the description below is depicted in FIG. 16, where audio is converted from analog to digital and prepared for unlink to the satellite.
Initialization:
STEP T-00 Flush the buffer memory by filling it with null sample values (all 0s).
   Initialize the Frame Type counter to 0. (This is a count of the relative Frame number in a 0, 1, 2, 3 sequence.)
   Initialize registers and pointers to be used in the main program.
   Set up a programmable hardware clock to provide an interrupt at a rate of 44,100 Hz
Main loop:
   Frames of data are packed for transmission via the uplink every 1/44,100th of a second. A "Frame" in this example can have one of three sizes, depending on the content at a particular time. In FIG. 16, the outgoing data stream always has a single "Present" stereo sample of 4 bytes ("P"). Every other Frame also includes a "Soon" stereo sample of 4 bytes ("S") (8 bytes total). Every fourth Frame includes a "Present" (P) and a "Soon" (S) sample, plus a "Future" ("F") single byte sample (9 bytes total). The Frames can also include a header, identifying size and type, data error detection bits, and other ancillary information.
STEP T-01 Wait (loop) until a timing interrupt occurs (detect the leading edge of the pulse).
   Get a present sample from the exit of the buffer memory (read the sample value).
   Inset it in the Frame. (A Frame always contains a Present sample.)
   (The same clock could be used to trigger the A/D device to convert, if needed.)
STEP T-02 Is this an ODD Frame? (Is this the Frame Type count 1 or 3?)
   If not, skip to STEP T-04, since this is not a Soon or a Future Frame type.
   Get (read) a Soon sample from the tap (delayed position/address) in the buffer.
   Insert it in the frame.
STEP T-03 Is this the Fourth Frame? (Is the Frame Type count equal to 3?)
   If not, skip to STEP T-04, since this is not a Future Frame type.
   Get (read) a Future sample from the start of the buffer.
   Convert the stereo sample to monophonic (e.g., add the two 16 bit right and left audio channel samples together, then divide by two to get a single bit monophonic sample.)
   Truncate the 16 bit monophonic (e.g., add the two 16 bit right and left audio channel samples together, then divide by two to get a single 16 bit monophonic sample).
   Truncate the 16 bit monophonic sample to 8 bits (e.g., discard the high-order byte).
   Insert the 8 bit, monophonic Future sample into the Frame.
STEP T-04 Add the appropriate header information to the Frame (e.g., the Frame Type).
   Alert the uplink that a Frame is ready for transmittal (e.g., set a data ready flag). (The Frame data could be read by the uplink circuitry by a number of means such as examining designated ports to the CPU.)
   (The uplink circuitry reads the Frame header to get its size, then reads the correct amount of data for the Frame and transmits it, and then resets the data ready flag.)
   Update the Frame Type counter. (Increment, and if more than 3 reset to 0).
   Update the buffer pointers to Future, Soon, and Present. (Decrement, and reset if rollover, a standard "ring buffer" technique.)
   (This is the equivalent of "shifting" the buffer, were it implemented in a hardware shift register.)
   Get a new 16 bit stereo sample from the audio feed, and insert it at the "Future" pointer position in the buffer.
   Loop back up to STEP T-01 to build the next frame to transmit.

The above process continues indefinitely, continually building Frames and transmitting them to the satellite via uplink.

Post-receiver Data Operations Description (e.g., Car Radio)

The receiver (car radio) can have its own time base (clock), similar to the clock described in the Transmitter Data Operations Description described above. (Synchronization of the clocks would be via any of several well known means.) The following pseudo-code occurs (loops) at every receiver clock cycle, here assumed as 44,100 Hz, the same as the standard CD music format PCM sampling rate and the same as the Transmission sample clock. A hardware clock (a chip having a down-counter and oscillator time base reference), sends an interrupt which the software program can detect, and a new stereo, 16 bit PCM audio sample is then fed to the output DAC for the production of analog audio for subsequent amplification.

The "Receiver" referred to here is depicted in FIG. 16 where digital data is received from the satellite and converted to an analog audio signal.

Initialization:

STEP R-00 Flush all stages of the buffer memory including the "OK flag" bits filling with null sample values (all 0s).

Initialize registers and pointers to be used by the main program.

Initialize the buffer clock count to 0 (of 0–3 possible).

Main Loop:

Unpack Frames of data received via the downlink once every 1/44, 100th of a second. A "Frame" in this example can have one of three sizes, as described in the Transmit discussion.

STEP R-01 Wait (loop) until a timing interrupt occurs (detect the leading edge of the pulse).

Get (read into temporary storage) a Frame of data from the incoming downlinked data stream.

Determine from the Frame header the Frame Type and size. (Which types of data does this Frame contain: Present, Soon, Future bytes?) (The system clocks should be synchronized such that the Frame Types correspond to the buffer clock count.)

Determine from the frame header error detection information whether all data in the Frame has been correctly received, and set the "OK flag" bit accordingly (e.g., is the Frame checksum correct?)

[The ⇒OR" switch function is implemented for the incoming Present sample, and the delayed Future and Soon samples if needed.]

If the OK Flag for the incoming Frame is OK, then select the Present sample from the incoming Frame via the "OR" switch, interpolate between odd/even samples if needed, and skip to STEP R-02.

Create a null sample, and fall through to STEP R-02. (Neither the Present sample or the delayed Future/Soon samples were valid, a blockage leaked through.)

STEP R-02 Send the sample to the DAC and clock it out. (This is a basic PCM audio output cycle.)

If the buffer clock count is NOT 1 or 3, skip to STEP R-04.

[This is an odd clock cycle: the buffer second stage needs updating.]

Shift the buffer stage 2 one element by moving its pointers (or shifting it if a true shift register is used).

If the OK Flag of the incoming "Soon" sample is OK, then insert the new Soon sample at the input of buffer stage 2, and skip to STEP R-03.

[The Soon sample was bad. Create a sample to input to buffer stage 2 from buffer stage 1.]

If the output sample of buffer stage 1 is not valid (bad OK Flag), then set the OK Flag of the buffer Stage 2 input sample to 0 (bad), and skip to STEP R-03.

Get a sample from the output of buffer stage 1 (8 bit monophonic, a single byte). Use the same data for both Right and Left channels, interpolate between samples if needed, and insert at the buffer stage 2 input.

[Update buffer stage 1 if this is a clock count of 3.]

STEP R-03 If the buffer clock count is NOT 3, skip to STEP R-04.

Shift the buffer stage 1 one element by moving its pointers (or shifting it if a true shift register is used).

If the incoming "Future" sample is good (OK Flag is OK), then insert the new Future sample at the input of buffer stage 1 and skip to STEP R-04.

Set the OK Flag to 0 (bad) of the input to buffer stage 1.

STEP R-04 Update the buffer clock counter. (Increment, and if more than 3 reset to 0).

Loop back up to STEP R-01 to build the next Frame to transmit.

The above process continues indefinitely, continually unpacking Frames received, sending PCM data to the DAC, and updating the buffer stages with new data.

EXAMPLE II

Figure 17A:
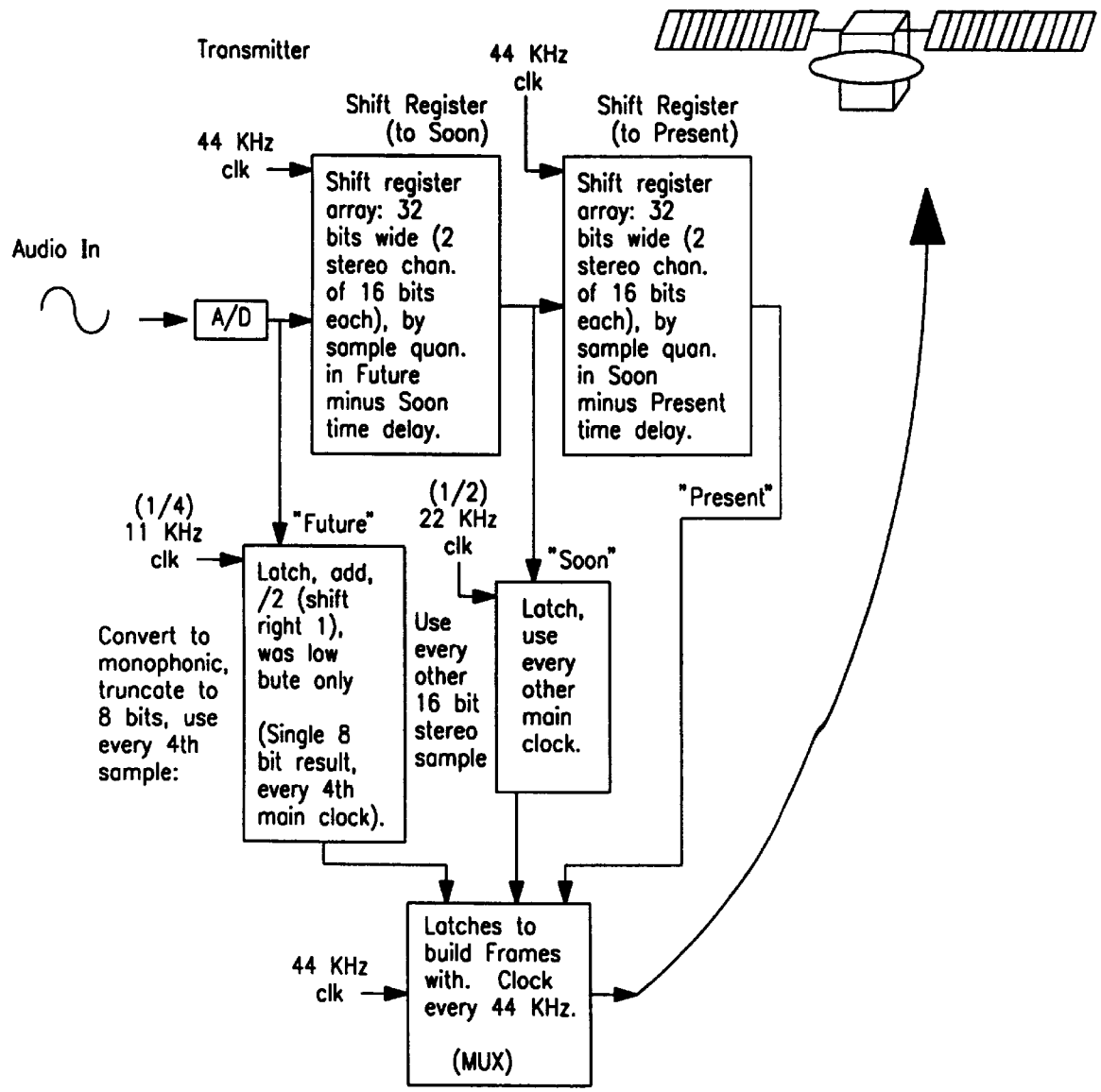
FIG. 17 illustrates an example dedicated logic implementation of the present invention.
Figure 17B:
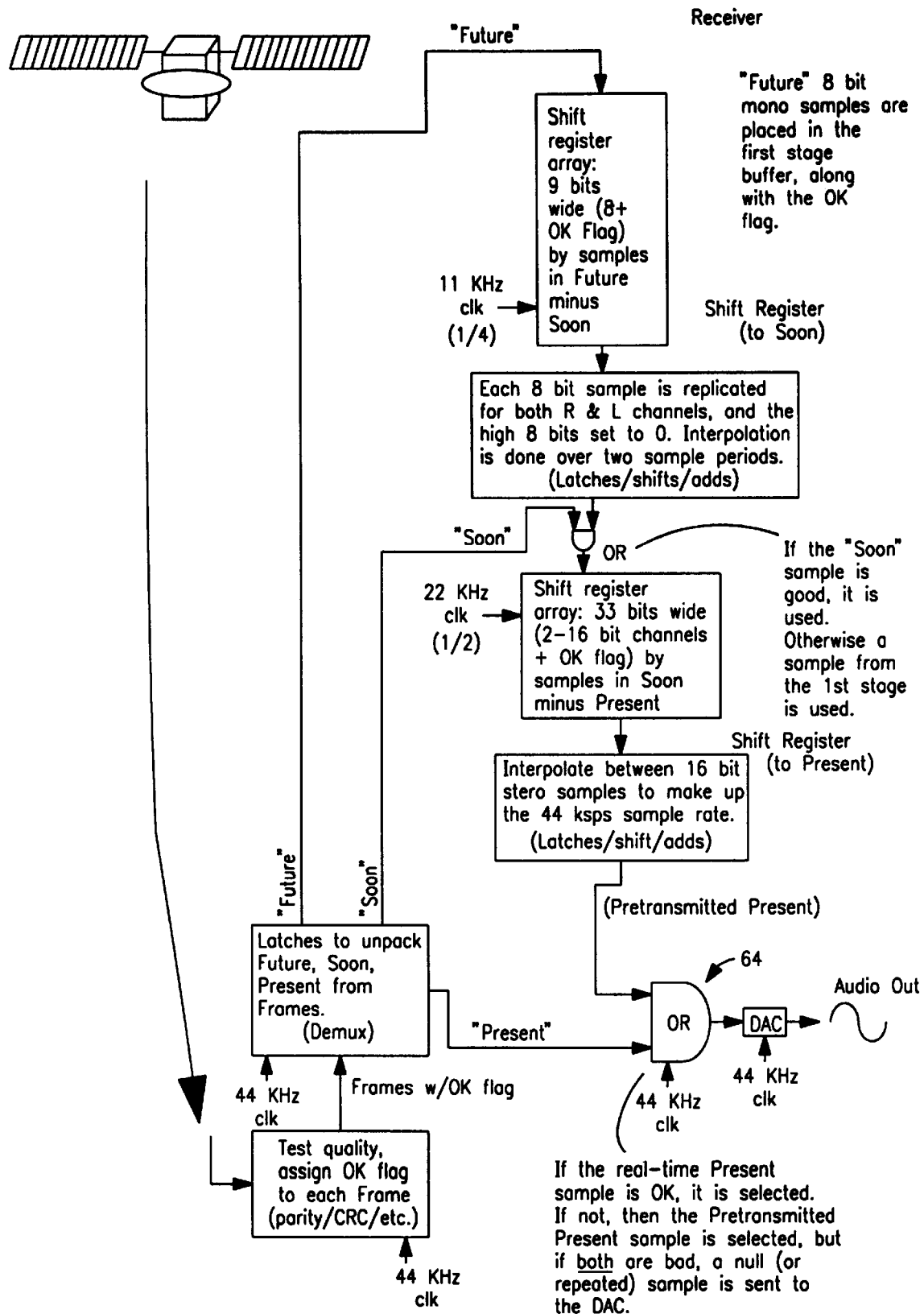

Referring to FIG. 17 block diagrams of an example embodiment of dedicated logic systems for the pre-transmitter and post-receiver systems of the present invention are shown and described.

The present invention has been described in considerable detail with reference to certain preferred versions thereof; however, other versions are possible. For example, depending on the specific performance goals of a given system, any combination of more temporal taps, reduced data rates to conserve bit rate resources, and use of more than one satellite is contemplated by the present invention. Therefore, the spirit and scope of the appended claims should not be limited to the description of the preferred versions contained herein.

What is claimed is:

1. A method for providing digital broadcast communications in a mobile user environment comprising:

creating multiple digital versions of a source signal having differing levels of quality, each of the digital versions including frames of digital data, said multiple versions differing in quality by one of the group selected from transmitting the digital versions at different bit rates, transmitting the digital versions at different amplitude resolutions determined by the number of bits per frame, and transmitting the digital versions at differing sampling periods;

intentionally delaying in time the transmission of the multiple digital versions of the source signal relative to each other prior to transmission so as to decorrelate the signal propagation effects experienced by each signal's transmission to a mobile receiver based on selected predetermined criteria; and receiving at the mobile receiver the multiple time-separated digital versions of the source signals and using such versions to produce a continuous output signal that represents the source signal at a predetermined level of quality.

2. The method according to claim 1 including utilizing a source signal having a content that is audio, data or video.

3. The method according to claim 1 including processing the source signal utilizing a compression algorithm.

4. The method according to claim 3 including varying the compression ratio to produce the different quality versions of the source signal.

5. The method according to claim 1 including transmitting the multiple signals to the mobile receivers suing time division multiplexing.

6. The method according to claim 1 including processing the transmitted signals by an error correction encoder prior to transmission.

7. The method according to claim 1 including aligning, in the mobile receiver, the multiple received signals in time and producing an output signal by selecting one of the multiple received signals on a segment-by-segment basis.

8. The method according to claim 7 including utilizing segments corresponding to one or more frames of a data, audio, or video compression algorithm.

9. The method according to claim 7 wherein the step of producing an output signal by selecting one of the multiple received signals comprises selecting the output signal based on the received quality signal-to-noise ratio, detected bit-error-rate, received signal level or tracking loop statistics.

10. The method according to claim 1 further comprising:

simultaneously broadcasting multiple different source signals to said mobile receivers; and independently selecting, in each mobile receiver, the source signal to be processed for user output.

11. The method according to claim 1 including utilizing multiple satellites to transmit the multiple time-separated signals directly to the mobile receivers.

12. The method according to claim 1 including producing a continuous output signal that is the same in content as the source signal.

13. The method according to claim 1 including producing a continuous output signal that represents the source signal at a predetermined level of quality less than the level of quality of the original source signal.

14. A method for providing digital broadcast communications in a mobile user environment comprising:

creating multiple digital versions of a source signal where each version includes frames of a digital data, wherein each of the multiple digital versions contain some mutual information and some complementary information with the other multiple digital versions of the source signal at a first predetermined level of quality and multiple digital versions of the source signal are combinable to represent the source signal at a second predetermined level of quality;

intentionally delaying in time the transmission of the multiple digital versions of the source signal relative to each other prior to transmission so as to decorrelate the signal propagation effects experienced by each signal's transmission to a mobile receiver based on selected predetermined criteria; and receiving at the mobile receiver the multiple time-separated digital versions of the source signal and using such versions to produce a continuous output signal that represents the source signal at a predetermined level of quality.

15. The method according to claim 14 including utilizing a source signal having a content that is audio, data or video.

16. The method according to claim 15 including utilizing for the content of the source signal stereo audio, and wherein the step of transmitting multiple versions of the source signal includes transmitting separate signals for left and right channels of the stereo audio.

17. The method according to claim 14 including processing the source signal utilizing a compression algorithm.

18. The method according to claim 14 including transmitting the multiple signals to the mobile receivers using time division multiplexing.

19. The method according to claim 14 including processing the transmitted signals by an error correction encoder prior to transmission.

20. The method according to claim 14 including aligning, in the mobile receiver, the multiple received signals in time and producing an output signal by selecting one of the multiple received signals in time and producing an output signal by selecting one of the multiple received signals or combining the multiple received signals on a segment-by-segment basis.

21. The method according to claim 20 including utilizing segments corresponding to one or more frames of a data, audio, or video compression algorithm.

22. The method according to claim 20 wherein the step of producing an output signal by selecting one of the multiple received signals or combining the received signals comprises producing the output signal based on the received quality signal-to-noise ratio, detected bit-error-rate, received signal level or tracking loop statistics.

23. The method according to claim 14 further comprising:

simultaneously broadcasting multiple different source signals to said mobile receivers; and independently selecting, in each mobile receiver, the source signal to be processed for user output.

24. The method according to claim 14 including utilizing multiple satellites to transmit the multiple time-separated signals directly to the mobile receivers.

25. The method according to claim 14 including producing a signal source at the second predetermined level of quality that is greater than said signal source at the first predetermined level of quality.

* * * * *